(12) United States Patent
Ohno

(10) Patent No.: US 10,408,409 B2
(45) Date of Patent: Sep. 10, 2019

(54) LAMP UNIT, VEHICULAR LAMP SYSTEM

(71) Applicant: Stanley Electric Co., Ltd., Tokyo (JP)

(72) Inventor: Masafumi Ohno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/966,720

(22) Filed: Apr. 30, 2018

(65) Prior Publication Data
US 2018/0328561 A1 Nov. 15, 2018

(30) Foreign Application Priority Data

May 11, 2017 (JP) ................................. 2017-094947

(51) Int. Cl.
F21S 41/64 (2018.01)
G02F 1/13 (2006.01)
F21S 41/255 (2018.01)
F21S 41/32 (2018.01)
F21S 41/148 (2018.01)
F21W 102/14 (2018.01)

(52) U.S. Cl.
CPC .......... *F21S 41/645* (2018.01); *F21S 41/148* (2018.01); *F21S 41/255* (2018.01); *F21S 41/321* (2018.01); *G02F 1/1313* (2013.01); *B60Q 2300/056* (2013.01); *F21W 2102/14* (2018.01)

(58) Field of Classification Search
CPC .. F21S 41/645; F21S 41/64; B60Q 2300/056; G02F 1/1313; G02F 1/1347
USPC ....................................................... 362/321
See application file for complete search history.

(56) References Cited

U.S. PATENT DOCUMENTS 4,985,816 A 1/1991 Seko et al.
7,537,365 B2 * 5/2009 Bender .................... B60Q 1/14
362/507
(Continued)

FOREIGN PATENT DOCUMENTS

DE 112013003050 T5 3/2015
EP 2275735 A1 1/2011
(Continued)

OTHER PUBLICATIONS

The extended European Search Report for the related European Patent Application No. 18171359.5 dated Oct. 11, 2018.

*Primary Examiner* — William N Harris
(74) *Attorney, Agent, or Firm* — Kenealy Vaidya LLP

(57) ABSTRACT

To achieve a high-quality light distribution pattern in a lamp unit used in a vehicular lamp system that selectively irradiates the front of a vehicle. The unit includes a light source, an optical shutter device, and an optical system where the optical shutter device has a first liquid crystal device having first light modulation areas and a second liquid crystal device having second light modulating areas. The first light modulation areas are arranged with a gap at least in a first direction and the second light modulation areas are arranged with a gap at least in the first direction. The first liquid crystal device and the second liquid crystal device overlap with each other such that, in a plan view, the first light modulation areas and the second light modulation areas are arranged complementarily to each other without forming a gap between the two modulation areas.

8 Claims, 10 Drawing Sheets

(56) References Cited

U.S. PATENT DOCUMENTS

| | | | |
|---|---|---|---|
| 2011/0013412 A1* | 1/2011 | Kobayashi | F21S 41/645 |
| | | | 362/538 |
| 2015/0191115 A1* | 7/2015 | Yamamura | F21S 41/143 |
| | | | 315/82 |
| 2017/0132970 A1* | 5/2017 | Tang | G09G 3/3208 |

FOREIGN PATENT DOCUMENTS

| EP | 2607164 A1 | 6/2013 |
|---|---|---|
| EP | 2980470 A1 | 2/2016 |
| JP | 1-244934 A | 9/1989 |
| JP | 2005-71731 A | 3/2005 |
| JP | 2013-1234 A | 1/2013 |

* cited by examiner 3R (3L)

FIG.5
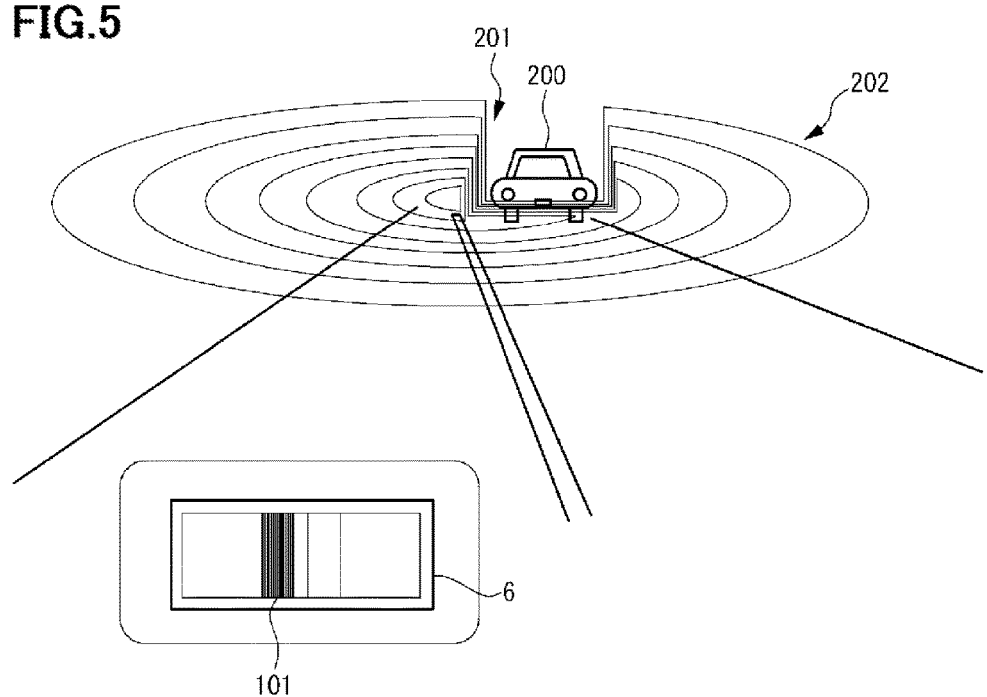
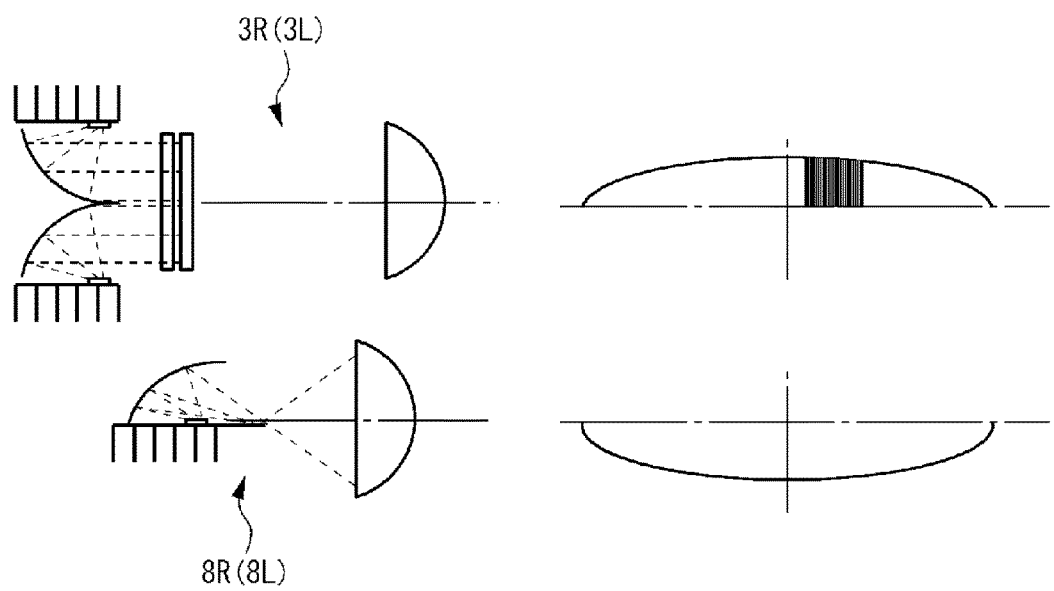
FIG.6A  FIG.6B

FIG.10
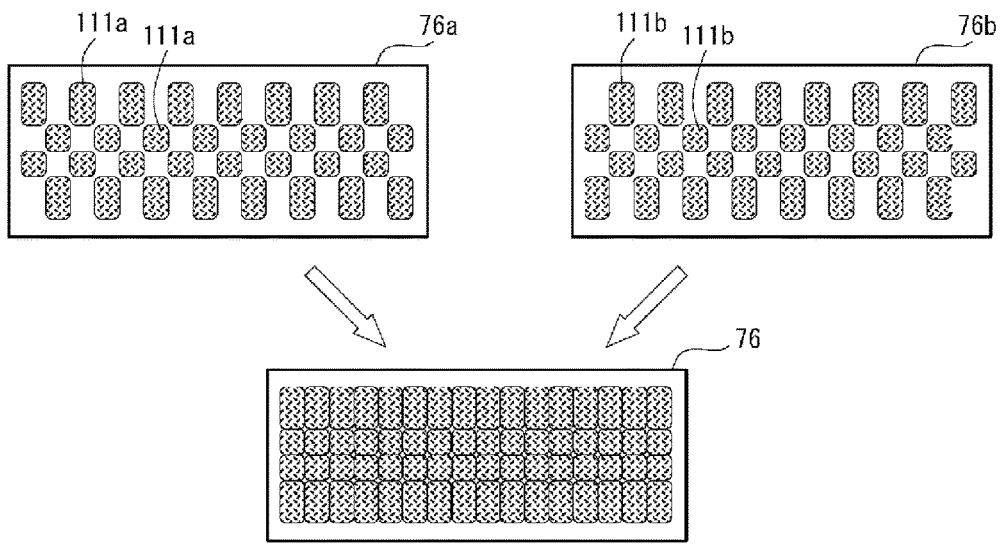
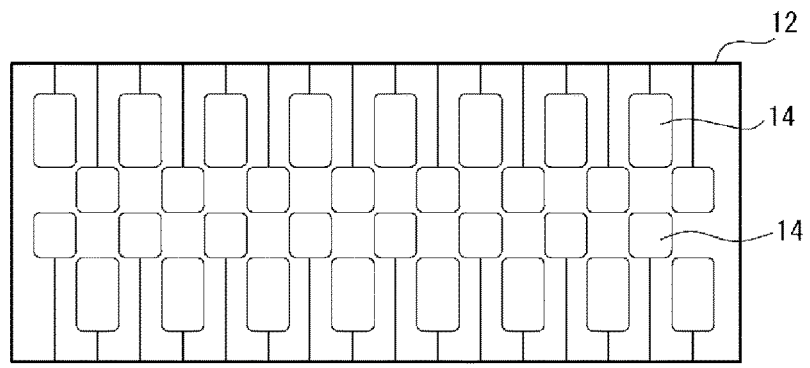
FIG.11A
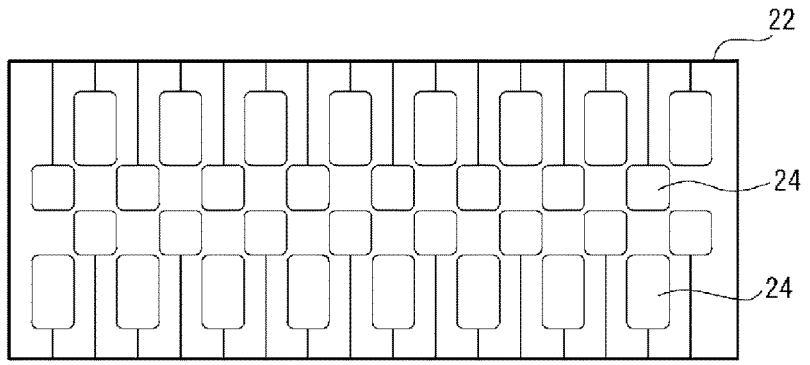
FIG.11B

FIG.12
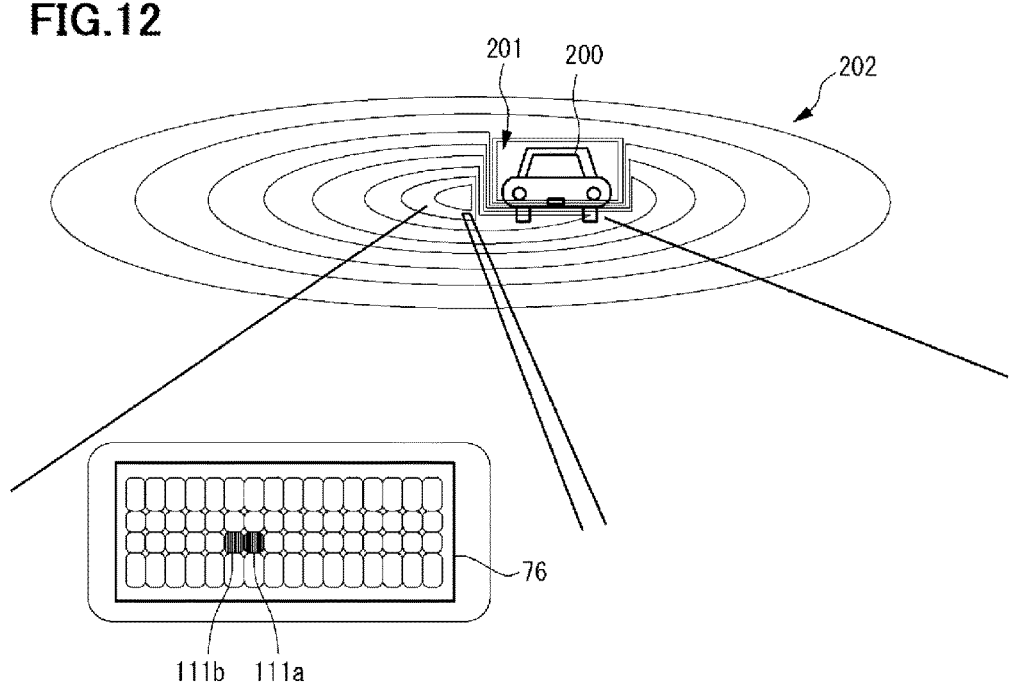
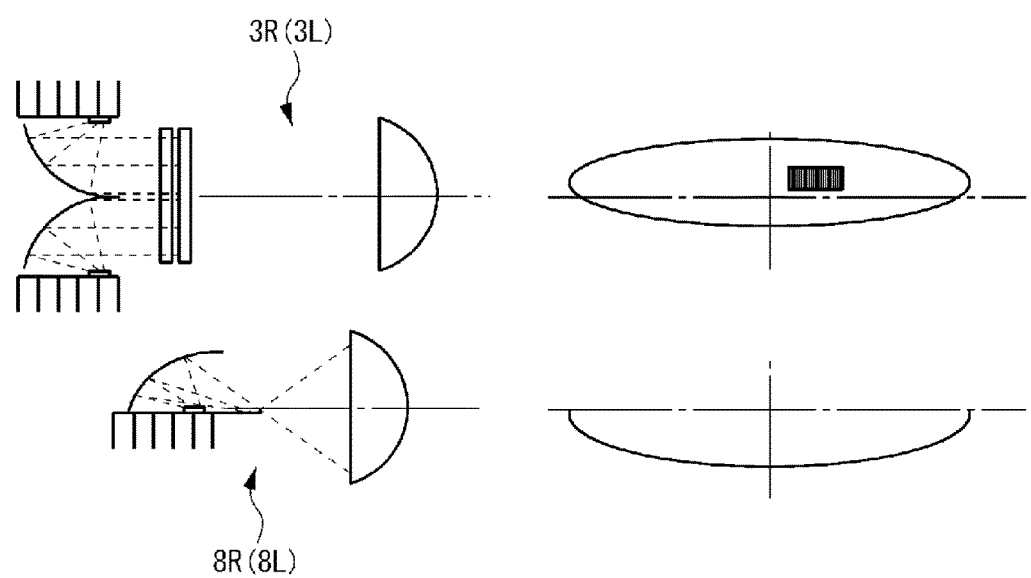
FIG.13A  FIG.13B

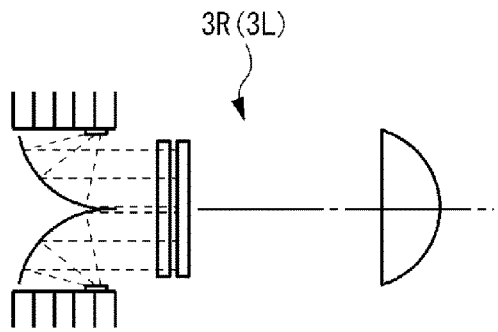 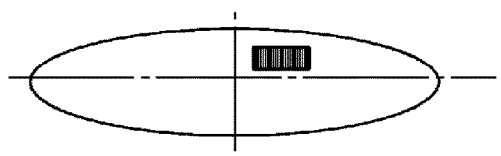
FIG.14A    FIG.14B
FIG.15
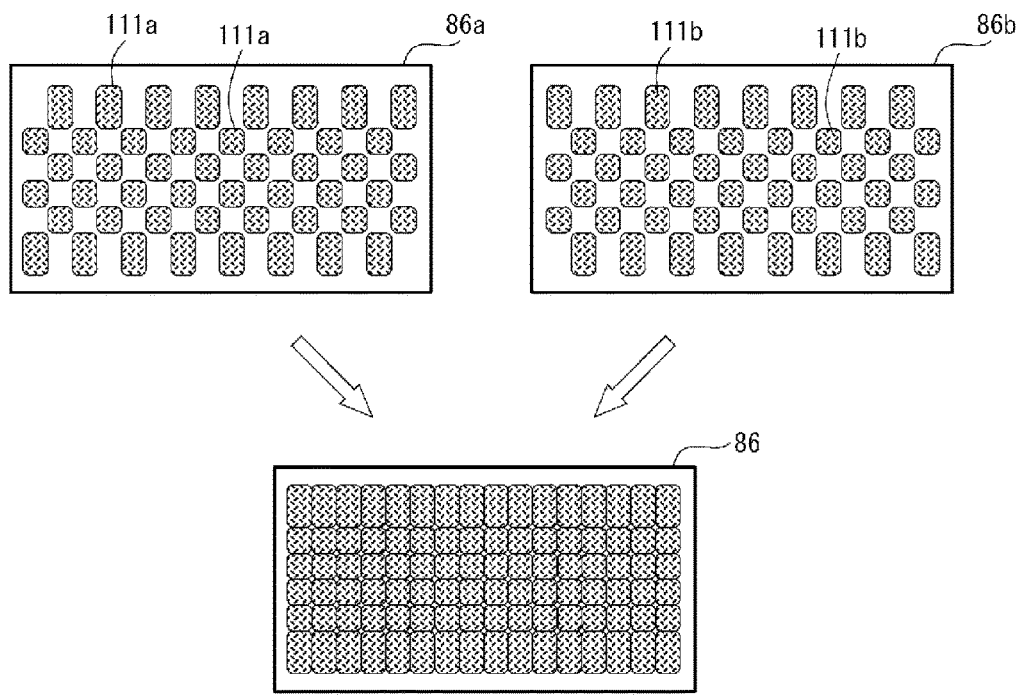

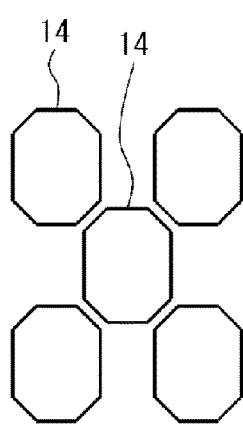
FIG.17A
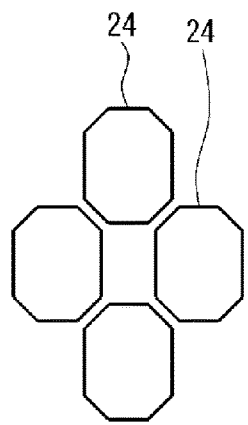
FIG.17B
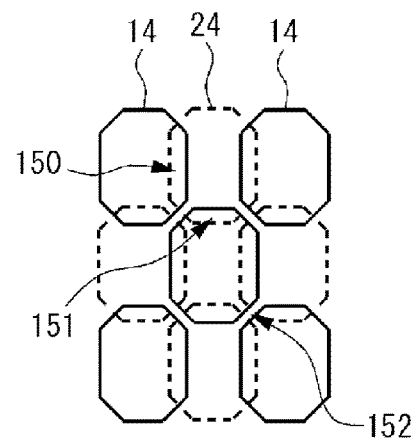
FIG.17C
FIG.18
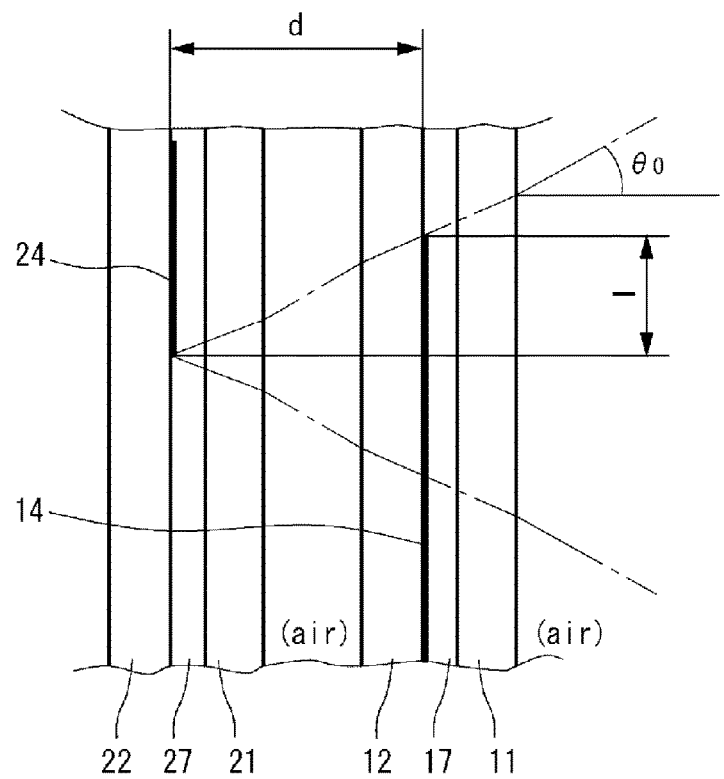

LAMP UNIT, VEHICULAR LAMP SYSTEM

BACKGROUND OF THE INVENTION

Field of the Invention

The present invention relates to a technique for performing light irradiation to the periphery (for example, the front side) of a vehicle, and more particularly to a technique for performing selective light irradiation according to the presence or absence of a target object such as an oncoming vehicle or a preceding vehicle.

Description of the Background Art

Japanese Unexamined Patent Publication No. Hei 01-244934 discloses a headlamp apparatus for vehicles that provides various light distribution patterns by partially shielding or transmitting light emitted from a light source by using a liquid crystal device (a liquid crystal plate). The liquid crystal device used in the headlamp apparatus includes a plurality of light transmitting elements arranged in a matrix where each light transmitting element is electrically and independently controlled.

The liquid crystal device used in the above-described headlamp apparatus includes a pair of transparent substrates each having an electrode and a liquid crystal layer disposed therebetween, a plurality of individual electrodes that are separated and independent from one other in a matrix form on one transparent substrate, a common electrode that faces all the individual electrodes on the other transparent substrate, thereby forming a light transmission element between each individual electrode and the common electrode.

Here, as described above, in order to constitute a plurality of light transmitting elements capable of independent control, individual electrodes are required to be separated from one another. In this case, each individual electrode is provided with a predetermined interval (for example, several hundred μm) spaced from one another on the transparent substrate in order to secure electrical independence.

Thus, a gap between the adjacent light transmission elements that cannot electrically control the transmitted light is inevitably formed. Such a gap becomes an area where light always passes or an area where light never passes, resulting in a bright line or a dark line in the light distribution pattern formed in front of the vehicle which was not originally intended and degrade the quality of the light distribution pattern.

Therefore, In a specific aspect, it is an object of the present invention to provide a technique capable of achieving a high-quality light distribution pattern.

SUMMARY OF THE INVENTION

[1] A lamp unit according to one aspect of the present invention is (a) a lamp unit used in a vehicular lamp system that selectively irradiates the surroundings of a vehicle that includes (b) a light source, an optical shutter device that modulates light emitted from the light source, and an optical system that forms a light image that passes through the optical shutter device, where (c) the optical shutter device has a first liquid crystal device having a plurality of first light modulation areas and a second liquid crystal device having a plurality of second light modulating areas, where (d) the plurality of first light modulation areas are arranged with a gap at least in a first direction and the plurality of second light modulation areas are arranged with a gap at least in the first direction, and where (e) the first liquid crystal device and the second liquid crystal device overlap with each other such that, in a plan view, the plurality of first light modulation areas and the plurality of second light modulation areas are arranged complementarily to each other without forming a gap between the adjacent first modulation areas and the second modulation areas.

[2] A lamp unit according to one aspect of the present invention is (a) a lamp unit used in a vehicular lamp system that selectively irradiates the surroundings of a vehicle that includes (b) a light source, an optical shutter device that modulates light emitted from the light source, and an optical system that forms a light image that passes through the optical shutter device, where (c) the optical shutter device has a first liquid crystal device having a plurality of first light modulation areas and a second liquid crystal device having a plurality of second light modulating areas, where (d) the plurality of first light modulation areas are arranged with a gap at least in a first direction and the plurality of second light modulation areas are arranged with a gap at least in the first direction, and where (e) the optical system forms a light image such that, in a plan view, images created by each of the plurality of first light modulation areas and the plurality of second light modulation areas are arranged complementarily to each other without forming a gap between the adjacent first modulation areas and the second modulation areas.

[3] A vehicular lamp system according to one aspect of the present invention is a lamp system including any one of the lamp units described above, and a control unit that controls the operation of the light source and the optical shutter device of the lamp unit.

According to the above-described configurations, a high-quality light distribution pattern can be achieved.

BRIEF DESCRIPTION OF THE DRAWINGS

FIG. 5 is a view for explaining the light distribution pattern formed by the lamp unit.

FIGS. 6A and 6B are views showing a configuration example of a lamp unit.

FIG. 10 is a view for explaining the light modulation area in each liquid crystal device constituting the optical shutter device of the second embodiment.

FIGS. 11A and 11B are schematic plan views for explaining the electrode structure of each liquid crystal device.

FIG. 12 is a view for explaining the light distribution pattern formed by the lamp unit of the second embodiment.

FIGS. 13A and 13B are views showing a configuration example of a lamp unit.

FIGS. 14A and 14B are views showing a configuration example of another lamp unit.

FIG. 15 is a view for explaining a modified example of the optical shutter device according to the second embodiment.

FIGS. 17A to 17C are schematic plan views for explaining the electrode structure of each liquid crystal device in the optical shutter device of the modified example.

FIG. 18 is a view for explaining preferable values of the distance of the areas where the two electrodes overlap.

DESCRIPTION OF THE PREFERRED EMBODIMENTS

First Embodiment

Figure 1:
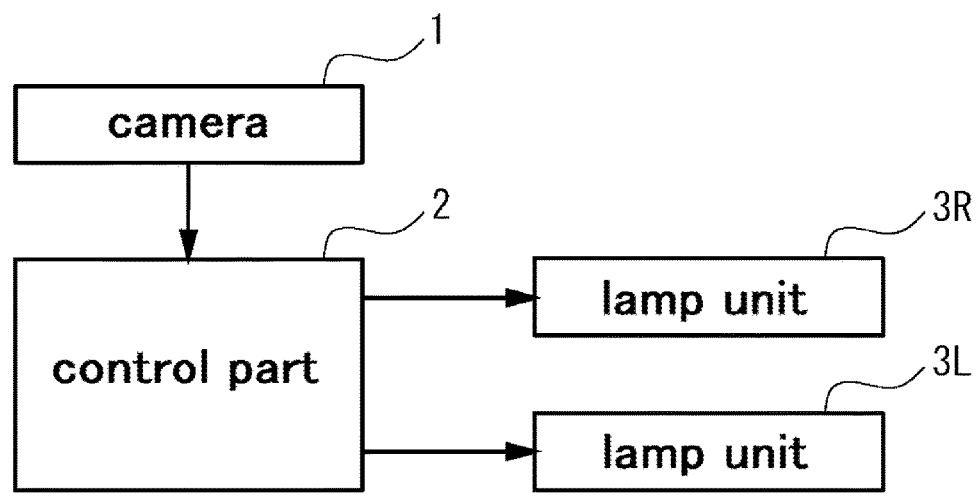
FIG. 1 is a block diagram illustrating a configuration of a vehicular lamp system according to one embodiment.

FIG. 1 is a block diagram showing a configuration of a vehicular lamp system according to one embodiment. In the vehicle lamp system shown in FIG. 1, based on images of the surroundings (for example, the front side) of the vehicle photographed by a camera 1, an image recognition process is performed and presence, or absence of target objects is detected by a control part 2. The target objects include an oncoming vehicle, a preceding vehicle, a pedestrian, for example. Then, according to the position of the target objects, the control part 2 controls lamp units 3R, 3L and the system selectively irradiates light. The camera 1 is arranged at a predetermined position in the vehicle (for example, the upper part of the windshield). The control part 2 carries out a predetermined operation program in a computer system comprising a CPU, ROM, RAM, and the like, for example. Regarding each of the lamp units 3R and 3L, the lamp unit 3R is disposed on the front right side of the vehicle, and the lamp unit 3L is disposed on the front left side of the vehicle.

Figure 2:
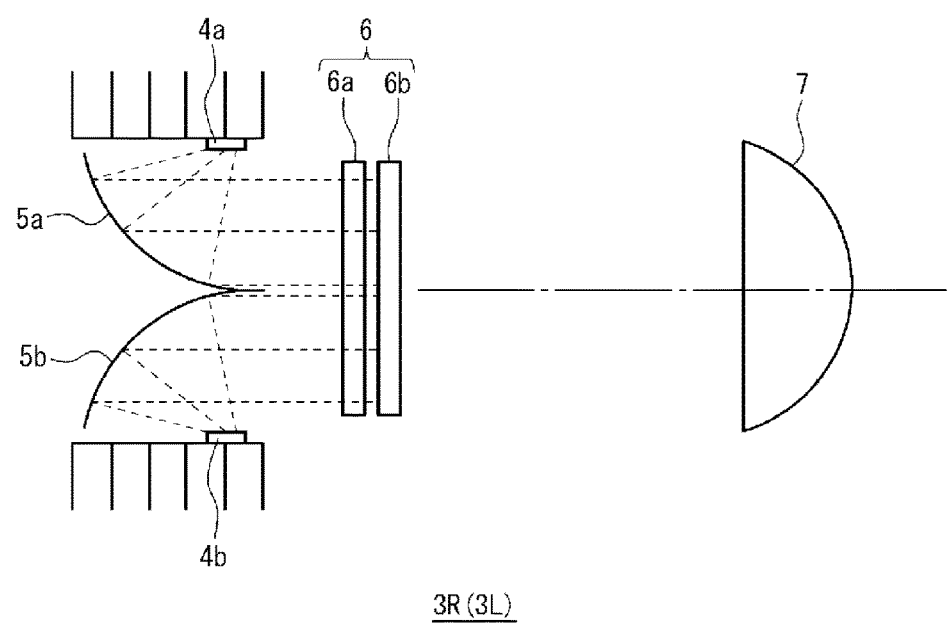
FIG. 2 is a view showing a configuration example of a lamp unit.

FIG. 2 is a view showing a configuration example of a lamp unit. Here, although the lamp unit 3R will be described, the same configuration applies to the lamp unit 3L as well. (The same shall apply hereinafter.) The lamp unit 3R is configured to include light sources 4a and 4b, reflecting mirrors 5a and 5b for reflecting light emitted from the light sources 4a and 4b to a specified direction, an optical shutter device 6 disposed at a position where the light reflected from the reflecting mirrors 5a and 5b is made incident, and an imaging projection optical system 7 including a lens, etc. for projecting an image formed by the light transmitted through the optical shutter device 6 to the front side of the vehicle.

Each of the light sources 4a and 4b is configured using a light emitting element such as LED, for example, and emits light upon being supplied with a driving current by a driver not shown in the figure. The driver for driving the light sources 4a and 4b operates based on the control signal provided from the control part 2.

The optical shutter device 6 is configured to include two liquid crystal devices 6a and 6b disposed to overlap with each other, and partially transmits or shields the light emitted from the light sources 4a and 4b and reflected from the reflecting mirrors 5a and 5b. Each of liquid crystal devices 6a, 6b operates based on a control signal provided from the control part 2. Light passing through the liquid crystal devices 6a and 6b is projected by the imaging projection optical system 7, thereby forming various light distribution patterns in front of the vehicle.

Figure 3:
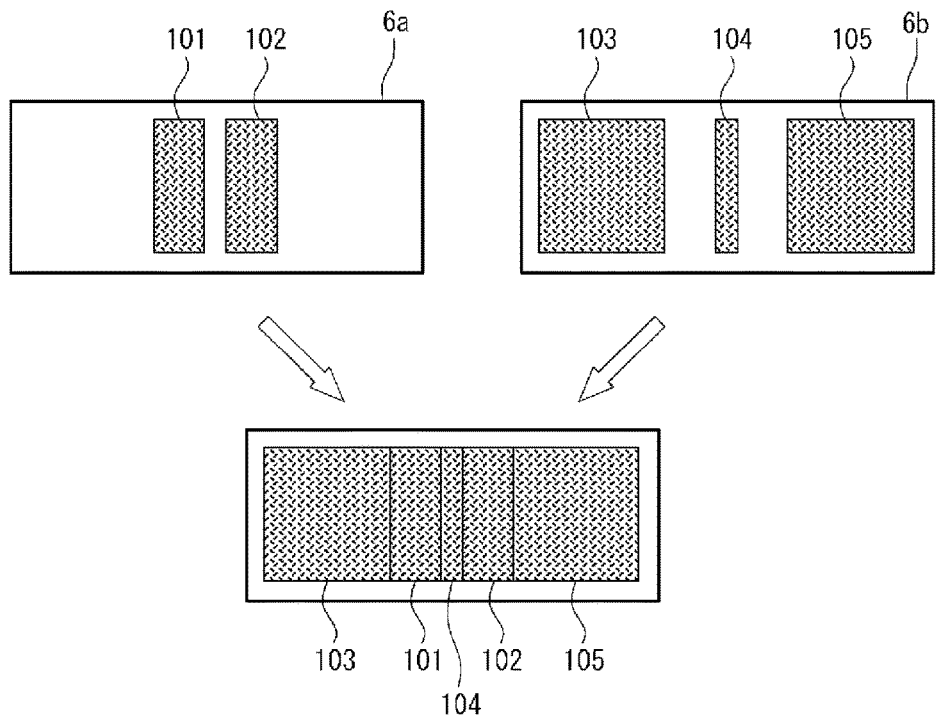
FIG. 3 is a view for explaining the area capable of switching between the transmission and the non-transmission of the light in each liquid crystal device constituting the optical shutter device.

FIG. 3 is a view for explaining the area capable of switching between the transmission and the non-transmission of the light in each liquid crystal device constituting the optical shutter device. As shown in the figure, the liquid crystal device 6a has light modulating areas 101 and 102 which are areas capable of independently switching between the transmission and the non-transmission of the light. Each of the light modulation areas 101 and 102 is provided near the center of the liquid crystal device 6a in the horizontal direction in the figure, and are separately arranged with a gap therebetween. Likewise, the liquid crystal device 6b has light modulating areas 103, 104, and 105 which are areas capable of independently switching between the transmission and the non-transmission of the light. Each of the light modulation areas 103, 104, and 105 is provided near both sides and the center of the liquid crystal device 6b in the horizontal direction in the figure, and are separately arranged with a gap therebetween. In the figure, for the purpose of ease of understanding, each light modulating areas 101 to 105 is shown with a notched striped pattern.

As shown in the figure, in the optical shutter device 6, the respective light modulating areas 101 and 102 of the liquid crystal device 6a and the respective light modulating areas 103, 104, and 105 of the liquid crystal device 6b are disposed having a mutually complementary relationship. That is, when the optical modulation areas of the liquid crystal devices 6a and 6b are overlapped, the respective optical modulation areas of the liquid crystal device are arranged so as to be disposed over the gaps of the optical modulation areas of the other liquid crystal device. Specifically, the light modulation area 104 of the liquid crystal device 6b is disposed between the light modulation areas 101 and 102 of the liquid crystal device 6a. Further, the light modulation area 101 of the liquid crystal device 6a is disposed between the light modulation areas 103 and 104 of the liquid crystal device 6b and the light modulation area 102 is arranged between the light modulation areas 104 and 105 of the liquid crystal device 6b. When viewing the optical shutter device 6 as a whole in plan view, that is, when the liquid crystal devices 6a and 6b are overlapped, the respective light modulation areas 101 to 105 are arranged without forming a gap between one another in the horizontal direction.

Figure 4:
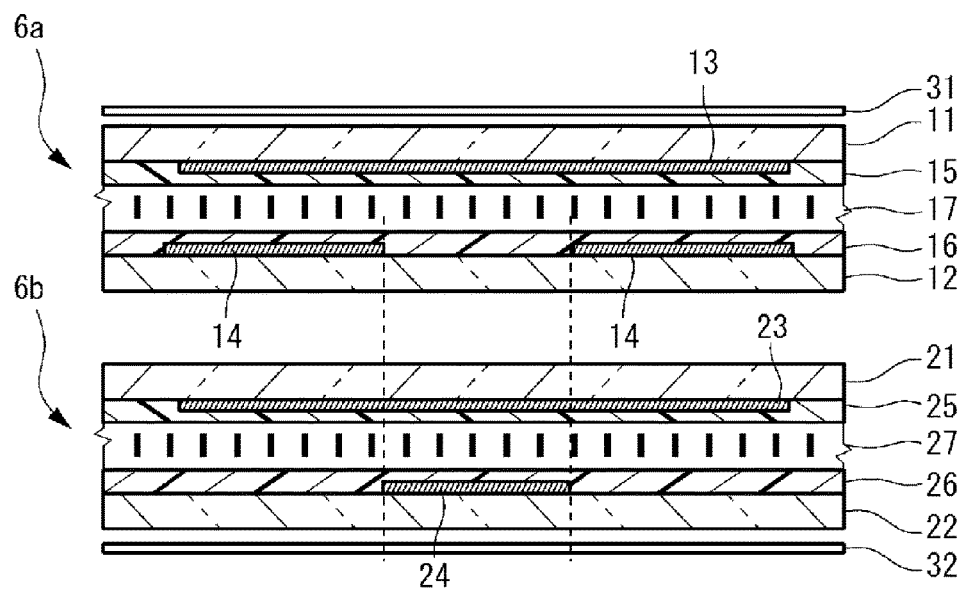
FIG. 4 is a schematic cross-sectional view showing the configuration of the optical shutter device.

FIG. 4 is a schematic cross-sectional view showing the configuration of the optical shutter device. As described above, the optical shutter device 6 of the present embodiment is configured to include two liquid crystal devices 6a and 6b, and these are arranged to overlap with each other. For convenience of illustration, a gap is provided between the liquid crystal device 6a and the liquid crystal device 6b, but in reality, there is no need for a gap, and in order to match the optical parameters such as the refractive index and the like, matching material may be provided in this gap.

The liquid crystal device 6a is configured to include a first substrate 11 and a second substrate 12 disposed to face each other, a first electrode 13 provided on the first substrate 11, a plurality of second electrodes 14 provided on the second substrate 12, and a liquid crystal layer 17 disposed between the first substrate 11 and the second substrate 12. Further, the liquid crystal device 6b is configured to include a third substrate 21 and a fourth substrate 22 disposed to face each other, a third electrode 23 provided on the third substrate 21, and a plurality of fourth electrodes 24 provided on the fourth substrate 22, and a liquid crystal layer 27 disposed between the third substrate 21 and the fourth substrate 22. A pair of polarizers 31, 32 are disposed, for example, such that the absorption axes of the pair of polarizers 31, 32 are substantially orthogonal to each other, and are opposed to each other with the liquid crystal devices 6a and 6b interposed therebetween. In the present embodiment, a normally black mode is assumed, which is an operation mode where transmittance is extremely low and light is shielded when no voltage is applied to the liquid crystal layers 17 and 27 of the respective liquid crystal devices 6a and 6b.

Each of the first substrate 11 and the second substrate 12 is shaped rectangularly in plan view and is disposed to face each other. Similarly, each of the third substrate 21 and the fourth substrate 22 is shaped rectangularly in a plan view and is disposed to face each other. For each substrate, for example, a transparent substrate such as a glass substrate, a plastic substrate, or the like may be used. Between the first substrate 11 and the second substrate 12 and between the third substrate 21 and the fourth substrate 22, a large number of spacers are uniformly and dispersedly arranged respectively, for example, and the spacers allow a desired gap, about several μm (micro-meter) for example, between the substrates.

The first electrode 13 is provided on one surface side of the first substrate 11 and each second electrode 14 is provided on one surface side of the second substrate 12. Similarly, the third electrode 23 is provided on one surface side of the third substrate 21 and each fourth electrode 24 is provided on one surface side of the fourth substrate 22. Each electrode is formed by appropriately patterning a transparent conductive film such as indium tin oxide (ITO), for example. Although not shown in the figure, an insulating film may be further provided on the upper surface of each electrode.

A first alignment film 15 is provided on one surface side of the first substrate 11 so as to cover the first electrode 13, and a second alignment film 16 is provided on one surface side of the second substrate 12 so as to cover the respective second electrodes 14. Similarly, a third alignment film 25 is provided on one surface side of the third substrate 21 so as to cover the third electrode 23, and a fourth alignment film 26 is provided on one surface side of the fourth substrate 22 so as to cover the respective fourth electrodes 24. As each alignment film, a vertical alignment film that vertically controls the alignment of the liquid crystal molecules in the liquid crystal layers 17 and 27 is used. Each alignment film is subjected to a uniaxial alignment treatment such as a rubbing treatment and has alignment regulating force in one direction. The direction of the alignment treatment between the alignment films 15 and 16 is anti-parallel, for example.

The liquid crystal layer 17 is provided between the first substrate 11 and the second substrate 12. Likewise, the liquid crystal layer 27 is provided between the third substrate 21 and the fourth substrate 22. In the present embodiment, the liquid crystal layers 17 and 27 are formed by using a nematic liquid crystal material having negative dielectric anisotropy $\Delta\varepsilon$ and without chiral material and having fluidity. In each of the liquid crystal layers 17 and 27 of this embodiment, the alignment direction of the liquid crystal molecules is inclined in one direction when no voltage is applied, and is set to be substantially vertically aligned having a pretilt angle of approximately 88 degrees or more and less than 90 degrees. When a voltage is applied between the first electrode 13 and the second electrode 14, the liquid crystal molecules in the liquid crystal layer 17 are aligned in the direction regulated by the uniaxial alignment treatment. Likewise, when a voltage is applied between the third electrode 23 and the fourth electrode 24, the liquid crystal molecules in the liquid crystal layer 27 are aligned in the direction controlled by the uniaxial alignment treatment.

In the liquid crystal device 6a, each of the areas where the first electrode 13 which is a common electrode and each second electrode 14 which is an individual electrode overlap with each other corresponds to the light modulation areas 101 and 102, respectively. Similarly, in the liquid crystal device 6b, each of the areas where the third electrode 23 which is a common electrode and each fourth electrode 24 which is an individual electrode overlap with each other corresponds to the light modulation areas 103, 104, and 105, respectively. By disposing each second electrode 14 of the liquid crystal device 6a and each fourth electrode 24 of the liquid crystal device 6b so that they do not substantially overlap with each other in a plan view, and by disposing each second electrode 14 and each fourth electrode 24 so that they do not form any gaps, it is possible to complementarily arrange the respective light modulation areas 101 to 105 among one another without any gap therebetween.

FIG. 5 is a view for explaining the light distribution pattern formed by the lamp unit. In the illustrated example, the light distribution pattern formed on the virtual screen at a predetermined position in front of the vehicle (25 meters ahead of the vehicle, for example) is schematically shown, and the lines drawn concentrically represent isophotes, that is, where the light intensity is the same. In this example, as illustrated in FIG. 6A, each of the lamp units 3R, 3L is used to form a high beam, and each of the other lamp units 8R, 8L is used to form a low beam. FIG. 6B illustrates an example of the formed high beam and low beam.

In the example of the light distribution pattern of the front view of the vehicle illustrated in FIG. 5, the area where the oncoming vehicle 200 exists is defined as a non-irradiation area 201, and the area other than the non-irradiation area 201 is defined as a light irradiation area 202. As shown in the frame in the figure, one light modulating area 101 of the optical shutter device 6 is being controlled to a non-transmissive state, and through this optical shutter device 6, a part of the irradiated light is shielded. The partially shielded light is horizontally inverted by the imaging projection optical system 7 and projected to the front of the vehicle, whereby the non-irradiation area 201 is formed by the part shielded by the light modulation area 101, and the light irradiation area 202 is formed by the other part which is not shielded. Here, since the respective light modulation areas 101 to 105 are arranged without any gap therebetween, no unintended dark lines are formed in the light irradiation area 202.

Figure 7:
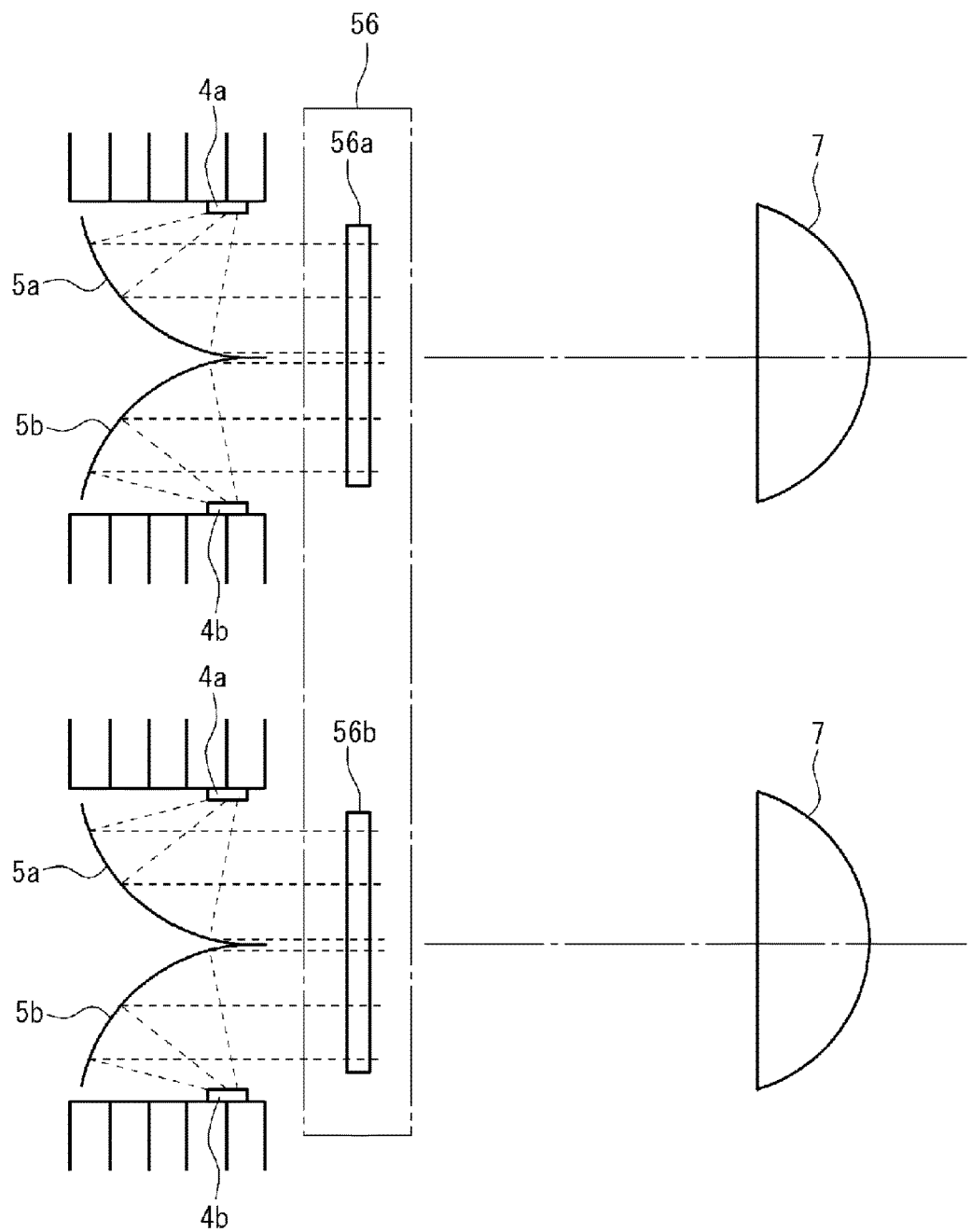
FIG. 7 is a view showing a modified example of the lamp unit according to the first embodiment.

FIG. 7 is a view showing a modified example of the lamp unit according to the first embodiment. The lamp unit 53R (or 53L) of this modified example is different from the above-described embodiment in that the respective liquid crystal devices 56a, 56b constituting the optical shutter device 56 are separately disposed without being disposed to overlap with each other, and each of the liquid crystal devices 56a, 56b is respectively associated with an independent optical system. Specifically, the liquid crystal device 56a is associated with a set of light sources 4a and 4b, reflecting mirrors 5a and 5b, and an image projection optical system 7, and the liquid crystal device 56b is associated with another set of light sources 4a and 4b, another reflecting mirrors 5a and 5b, and another imaging projection optical system 7. In this case, a pair of polarizers is provided for each of the liquid crystal devices 56a and 56b. Each of the images formed by the light modulated by the respective liquid crystal devices 56a and 56b is projected by each image projection optical system 7 and overlap with each other at a predetermined position in front of the vehicle to form various light distribution patterns. A gap is, or gaps are formed in the image generated by each of the light modulation areas of the individual liquid crystal devices 56a and 56b. However, the image formed in the light modulating area of one liquid crystal device is positioned onto the gaps of the image formed in the light modulating area of the other liquid crystal device. That is, the image formed by the respective light modulating areas 101 and 102 of the liquid crystal device 56a and the respective light modulating areas 103, 104, and 15 of the liquid crystal device 56b are complementarily arranged to form an image without forming a gap therebetween.

Figure 8:
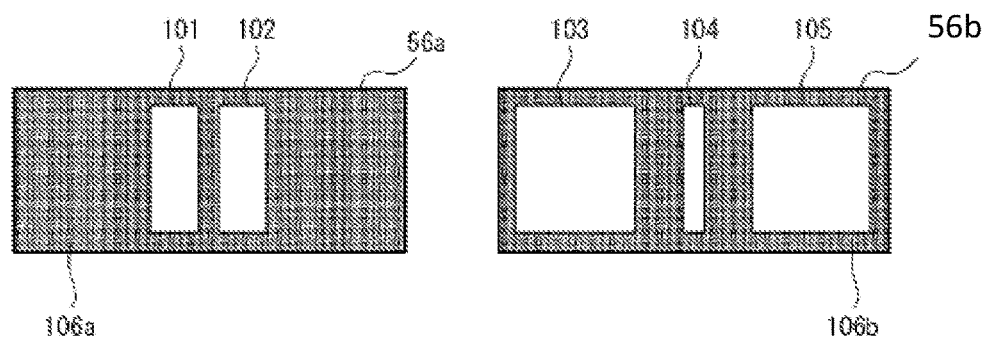
FIG. 8 is a plan view for explaining the configuration of the optical shutter device suitably used in the lamp unit of the modification example.

FIG. 8 is a plan view for explaining the configuration of the optical shutter device suitably used in the lamp unit of the above-described modification example. As shown in FIG. 8, in the optical shutter device 56 of the modified example, the liquid crystal device 56a has a light shielding portion 106a provided around and between the light modulation areas 101 and 102. Further, the liquid crystal device 56b has a light shielding portion 106b provided around and between each of the light modulating areas 103 to 105. The light shielding portion 106a is a light shielding film, that is, a black matrix, provided so as to fill the periphery of and between each of the second electrodes 14, for example. Similarly, the light shielding portion 106b is a light shielding film, that is, a black matrix, provided so as to fill the periphery of and between each of the fourth electrodes 24. By providing such light shielding portions, the contrast of the image formed by the optical shutter device 56 can further be improved. In the case of the normally black mode, two polarizers may also serve as a light shielding portion, but by additionally providing a light shielding film, contrast improvement can be enhanced. When a light shielding film is provided in addition to the polarizer forming the light shielding portion, a normally white mode may also be used. This mode is an operation mode where light is transmitted even when no voltage is applied to the liquid crystal layers 17 and 27 of the respective liquid crystal devices 56a and 56b, that is, light transmittance becomes extremely high.

Figure 9:
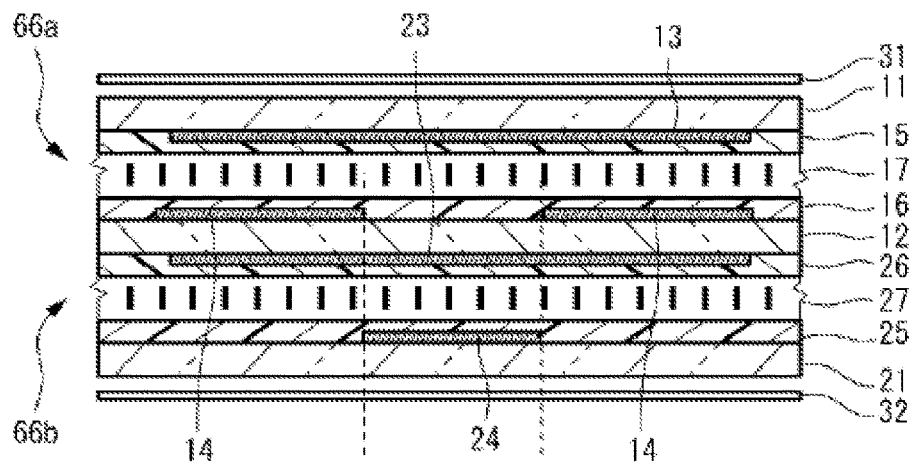
FIG. 9 is a schematic cross-sectional view showing the configuration of the modified example of the optical shutter device according to the first embodiment.

FIG. 9 is a schematic cross-sectional view showing the configuration of the modified example of the optical shutter device according to the first embodiment. The optical shutter device 66 of this modified example is different from the optical shutter device 6 described above in that the second substrate 12 is shared by the two liquid crystal devices 66a and 66b. In detail, the second substrate 12 of the optical shutter device 66 is arranged to be opposed to the first substrate 11 of the liquid crystal device 66a and the liquid crystal layer 17 is disposed between the two substrates, and further, the second substrate 12 is arranged to be opposed to the fourth substrate 21 of the liquid crystal device 66b and the liquid crystal layer 27 is disposed between the two substrates. Each second electrode 14 is provided on one surface side of the second substrate 12 and a third electrode 23 is provided on the other surface side of the second substrate 12. Note that the first substrate 11 side may be shared instead, and then, the electrode provided on the other side of the first substrate 11 may be either the third electrode 23 or the fourth electrode 24. Even with the use of such an optical shutter device 66, similar lamp units 3R and 3L as described above may be configured.

Second Embodiment

In the above-described first embodiment, the lamp unit and the vehicular lamp system using the optical shutter device having the plurality of light modulation areas arranged in one direction have been described. However, the light modulation areas may be arranged along two directions arrayed in a matrix. Here, in the second embodiment, since the overall configuration of the vehicular lamp system and the configuration of the lamp unit are the same as those of the first embodiment, a detailed description thereof will be omitted, and the configuration of the optical shutter device will be described in detail below.

FIG. 10 is a view for explaining the light modulation areas in each liquid crystal device constituting the optical shutter device of the second embodiment. In the figure, for the purpose of ease of understanding, each light modulating area is shown with a notched striped pattern. As shown in the figure, the liquid crystal device 76a has a plurality of light modulation areas 111a arranged along two directions with gaps provided therebetween, arranged in a checkered pattern as a whole. For convenience of illustration, only two optical modulation areas 111a are denoted by reference numerals. Likewise, the liquid crystal device 76b has a plurality of light modulation areas 111b arranged along two directions with gaps provided therebetween, arranged in a checkered pattern as a whole. For convenience of illustration, only two optical modulation areas 111b are denoted by reference numerals.

As shown in the figure, in the optical shutter device 76, the respective light modulating areas 111a of the liquid crystal device 76a and the respective light modulating areas 111b of the liquid crystal device 76b are disposed having a mutually complementary relationship. Specifically, each light modulating area 111a and each light modulating area 111b are arranged alternately one by one in two directions. When viewing the optical shutter device 76 as a whole in plan view, that is, a state where the liquid crystal devices 76a and 76b overlap with each other, the respective light modulation areas 111a and 111b are arranged without forming a gap between each other in both the vertical and the horizontal direction.

In the illustrated example, each of the light modulating areas 111a and 111b at the first row from the top has the same length as the ones at the fourth row from the top, respectively, and each of the light modulating areas 111a and 111b at the second row from the top has the same length as the ones at the third row from the top, respectively. Further, the length in the vertical direction in the figure (the height) of the modulation areas 111a and 111b at the second and third row from the top is shorter than the ones at the first and fourth row from the top, respectively. Here, the length in the horizontal direction in the figure (the width) of the modulation areas 111a and 111b are approximately the same.

FIGS. 11A and 11B are schematic plan views for explaining the electrode structure of each liquid crystal device. As shown in FIG. 11A, each second electrode 14 disposed on the second substrate 12 is provided so as to be associated with each light modulation area 111a. Among the second electrodes 14, each of the second electrodes 14 corresponding to the first and fourth row has a wire extending either to the upper end part or the lower end part of the second substrate 12. Also, among the second electrodes 14, each of the second electrodes 14 corresponding to the second row has a wire extending between the two adjacent second electrodes 14 corresponding to the first row and towards the upper end part of the second substrate 12.

Likewise, among the second electrodes 14, each of the second electrodes 14 corresponding to the third row has a wire extending between the two adjacent second electrodes 14 corresponding to the fourth row and towards the lower end part of the second substrate 12. By providing wirings individually to each second electrode 14, a voltage can be applied to each second electrode 14 thereby enabling to individually control each light modulating area 111*a*.

Further, the fourth electrodes 24 provided on the fourth substrate 22 have the same configuration as the second electrodes 14 on the second substrate 12 (refer to FIG. 11B), and voltages can be individually applied to the respective fourth electrodes 24 thereby enabling to individually control each light modulating area 111*b*.

FIG. 12 is a view for explaining the light distribution pattern formed by the lamp unit of the second embodiment. In the illustrated example, the light distribution pattern formed on the virtual screen at a predetermined position in front of the vehicle (25 meters ahead of the vehicle, for example) is schematically shown, and the lines drawn concentrically represent isophotes, that is, where the light intensity is the same. In this example, as illustrated in FIG. 13A, each of the lamp unit 3R, 3L is used to form a high beam, and each of the other lamp units 8R, 8L is used to form a low beam. FIG. 13B illustrates an example of the formed high beam and low beam.

Here, as illustrated in FIG. 14A, both of the high beam and the low beam may be formed by each of the lamp units 3R and 3L, and the high beam and the low beam in that case are illustrated in FIG. 14B. In addition, similar to the above-described first embodiment, the respective liquid crystal devices 76*a*, 76*b* constituting the optical shutter device 76 may be separately disposed without being disposed to overlap with each other, and each of the liquid crystal devices 76*a*, 76*b* may be respectively associated with an independent optical system (refer to FIG. 7).

In the example of a light distribution pattern of the front view of the vehicle illustrates in FIG. 12, the area where the oncoming vehicle 200 exists is defined as a non-irradiation area 201, and the area other than the non-irradiation area 201 is defined as a light irradiation area 202. As shown in the frame in the figure, one light modulating area 111*a* of the optical shutter device 76 and one light modulating area 111*b* adjacent thereto are being controlled to a non-transmissive state, and through this optical shutter device 76, a part of the irradiated light is shielded. The partially shielded light is horizontally inverted by the imaging projection optical system 7 and projected to the front of the vehicle, whereby the non-irradiation area 201 is formed by the part shielded by each of the light modulation areas 111*a* and 111*b*, and the light irradiation area 202 is formed by the other part which is not shielded. Here, since the respective light modulation areas 111*a* and 111*b* are arranged along the two directions without any gap therebetween, no unintended dark lines are formed in the light irradiation area 202.

FIG. 15 is a view for explaining a modified example of the optical shutter device according to the second embodiment. As the modified example in the figure shows, it is also possible to dispose more light modulating areas 111*a* and 111*b*. In the illustrated example, each of the liquid crystal devices 86*a* and 86B has a plurality of light modulation areas 111*a* and 111*b* arranged respectively in six rows in a checkered pattern as a whole. Also in the optical shutter device 86 of this modified example, as shown in the figure, the respective light modulating areas 111*a* of the liquid crystal device 86*a* and the respective light modulating areas 111*b* of the liquid crystal device 86*b* are disposed having a mutually complementary relationship.

Figure 16A:
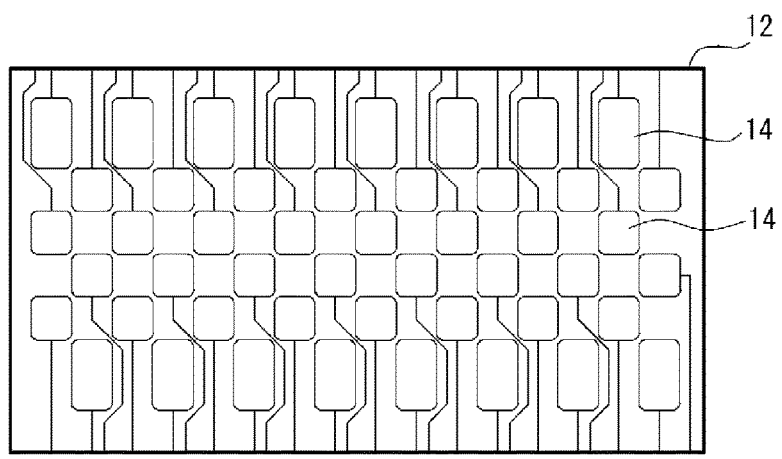
FIGS. 16A to 16C are schematic plan views for explaining the electrode structure of each liquid crystal device in the optical shutter device of the modified example.
Figure 16B:
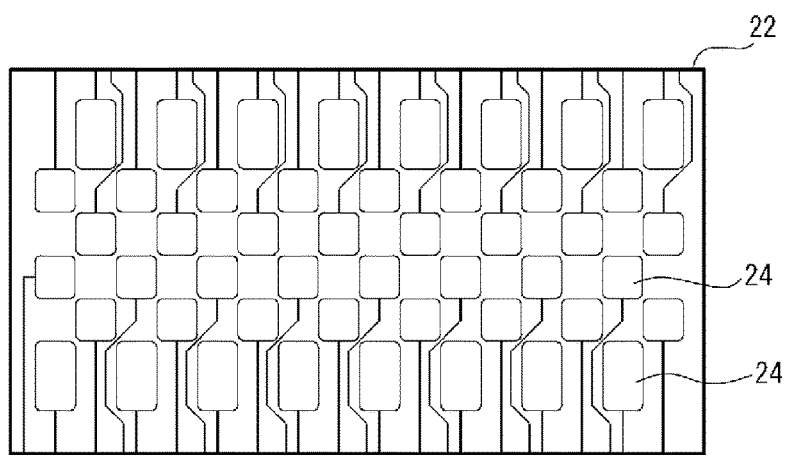
Figure 16C:
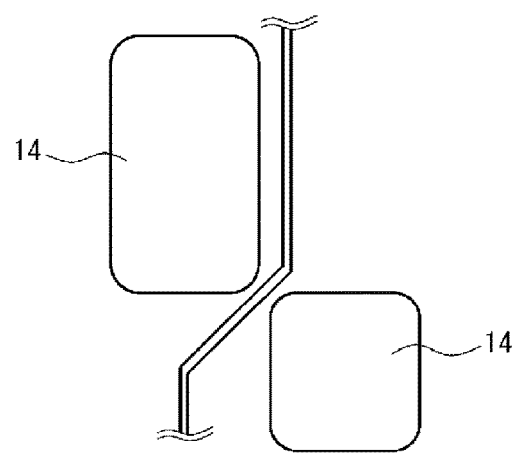

FIGS. 16A to 16C are schematic plan views for explaining the electrode structure of each liquid crystal device in the optical shutter device of the modified example. As shown in FIG. 16A, each second electrode 14 disposed on the second substrate 12 is provided so as to be associated with each light modulation area 111*a*. Likewise, as shown in FIG. 16B, each fourth electrode 24 disposed on the fourth substrate 22 is provided so as to be associated with each light modulation area 111*b*.

Here, each of the wirings provided in association with each of the second electrodes 14 in the third row from the top extends mostly between a second electrode 14 in the first row and a second electrode 14 in the second row disposed in the oblique direction thereof, and towards the upper end part of the second substrate 12 (refer to FIG. 16C). The same applies to each of the wirings provided in association with each of the fourth electrodes 24 in the third row from the top.

Similarly, each of the wirings provided in association with each of the second electrodes 14 in the fourth row from the top extends mostly between a second electrode 14 in the six row and a second electrode 14 in the fifth row disposed in the oblique direction thereof, and towards the lower end part of the second substrate 12 (refer to FIG. 16C). The same applies to each of the wirings provided in association with each of the fourth electrodes 24 in the fourth row from the top.

Further, in order to configure as described above, as shown in the enlarged view of FIG. 16C, it is preferable to chamfer the edges of each plane shaped second electrode 14 in each light modulating area to form a gap between the two edges, thereby making it easier to extend wirings therebetween. The same applies to each of the fourth electrodes 24.

FIGS. 17A to 17C are schematic plan views for explaining the electrode structure of each liquid crystal device in the optical shutter device of the modified example. Here, as described above, a preferable electrode structure where edges of each electrode are chamfered and gaps are formed between the edges of the respective electrodes will be described. FIG. 17A shows a number of the second electrodes 14 provided on the second substrate 12, and FIG. 17B shows a number of the fourth electrodes 24 provided on the fourth substrate 22. Each of the second electrodes 14 and the fourth electrodes 24 shown in each figure has an octagonal shape obtained by chamfering the four edges of the rectangular shaped electrodes, and is arranged in a checkered pattern with gaps provided therebetween.

FIG. 17C illustrates a plan view of each of the second electrodes 14 and the fourth electrodes 24 being overlapped with one another. As shown in the figure, for example, a second electrode 14 and a fourth electrode 24 adjacent to the second electrode 14 in the horizontal direction are arranged such that a portion thereof overlaps with each other. The distance of the area 150 in which these two electrodes overlap is appropriately set. Likewise, for example, a second electrode 14 and a fourth electrode 24 adjacent to the second electrode 14 in the vertical direction are arranged such that a portion thereof overlaps with each other. The distance of the area 151 in which these two electrodes overlap is appropriately set. By providing the areas 150 and 151 in which the electrodes overlap with each other in a plan view as described above, it is possible to further reduce the gap 152 formed between the light modulation areas 111*a* and 111*b* which are configured using these electrodes. In addition, in the manufacturing process, this configuration enables to prevent occurrence of bright lines or dark lines in the light modulation areas with more certainty. Similarly, in the first embodiment, overlapping areas between the electrodes may be provided.

FIG. 18 is a view for explaining preferable values of the distance of the areas 150, 151 where the above-described electrodes overlap. Here, the arrangement of the second electrode 14 provided on the second substrate 12 and the fourth electrode 24 provided on the fourth substrate 22 is schematically shown together with other constituent elements, in a side view. As shown in the figure, the distance (the overlap amount) of the area 150 (or 151) where the both electrodes overlap is represented by l (lowercase L). Further, let d be the distance between the electrodes, let $d_0$ be the thickness of the air layer, let $d_1$ be the thickness of the substrate, let $d_2$ be the thickness of the liquid crystal layer, . . . , and let $d_m$ be the thickness of any other layer which may intervene. Further, let $n_0$ be the refractive index of the air layer, let $n_1$ be the refractive index of the substrate, let $n_2$ be the refractive index of the liquid crystal layer, . . . , and let $n_m$ be the refractive index of any other layer which may intervene. Further, let $\theta_0$ be the marginal ray angle defined by numerical aperture (NA) (=sin $\theta_0$) in the air layer. Likewise, the marginal ray angle in each medium is defined as follows.

$\theta_0$: marginal ray angle in the air layer
$\theta_1$: marginal ray angle in the substrate
$\theta_2$: marginal ray angle in the liquid crystal layer
. . .
$\theta_m$: marginal ray angle in any other layer which may intervene According to Snell's law, $\theta_m$ is obtained by the following equation.

$$\theta_m = \sin^{-1}\left(\frac{n_0}{n_m}\sin\theta_0\right) \qquad \text{[numerical formula 1]}$$

And the required overlap amount l can be expressed as follows.

$$l \geq \sum_{x=0}^{m} d_x \tan\theta_x \qquad \text{[numerical formula 2]}$$

In the second embodiment, as in the configuration shown in FIG. 7, the liquid crystal devices 76a and 76b may be independently associated with the optical system without overlapping each other. Also in this case, in each liquid crystal device, the periphery of and between each of the light modulating areas is a light shielding portion in which a light shielding film is formed, for example.

According to each of the above-described embodiments, since an unintended dark line does not appear in the light distribution pattern originally formed in the front of the vehicle, a high-quality light distribution pattern can be achieved.

It should be noted that this invention is not limited to the subject matter of the foregoing embodiments, and can be implemented by being variously modified within the scope of the present invention as defined by the appended claims. For example, in the embodiment described above, although the liquid crystal device constituting the optical shutter device is assumed to operate in a normally black mode, the device can be used to operate in a normally white mode as well. Further, a diffusion type liquid crystal device can also be used. In that case, polarizers can be omitted.

Further, the arrangement of each liquid crystal device in the optical shutter device is not limited to the arrangements described above. For example, the first substrate 11 and the third substrate 21 may be arranged to face each other, or the second substrate 12 and the fourth substrate 22 may be arranged to face each other. Further, in the above described embodiments, liquid crystal devices with a vertically-aligned liquid crystal layer is exemplified, but the present invention is not limited thereto. Any operation mode may be used in the liquid crystal device as long as the partial areas of the irradiated light can be controlled/switched between the transmission and the non-transmission state.

What is claimed is:

1. A lamp unit used in a vehicular lamp system that selectively irradiates surroundings of a vehicle comprising:
   a light source, an optical shutter device that modulates light emitted from the light source, and an optical system that forms a light image that passes through the optical shutter device;
   wherein the optical shutter device has a first liquid crystal device having a plurality of first light modulation areas and a second liquid crystal device having a plurality of second light modulating areas;
   wherein the plurality of first light modulation areas are arranged with a gap at least in a first direction and the plurality of second light modulation areas are arranged with a gap at least in the first direction; and
   wherein the first liquid crystal device and the second liquid crystal device overlap with each other such that, in a plan view, the plurality of first light modulation areas and the plurality of second light modulation areas are arranged complementarily to each other without forming a gap between the adjacent first modulation areas and the second modulation areas.

2. A lamp unit used in a vehicular lamp system that selectively irradiates surroundings of a vehicle comprising:
   a light source, an optical shutter device that modulates light emitted from the light source, and an optical system that forms a light image that passes through the optical shutter device;
   wherein the optical shutter device has a first liquid crystal device having a plurality of first light modulation areas and a second liquid crystal device having a plurality of second light modulating areas;
   wherein the plurality of first light modulation areas are arranged with a gap at least in a first direction and the plurality of second light modulation areas are arranged with a gap at least in the first direction; and
   wherein the optical system forms a light image such that, in a plan view, images created by each of the plurality of first light modulation areas and the plurality of second light modulation areas are arranged complementarily to each other without forming a gap between the adjacent first modulation areas and the second modulation areas.

3. The lamp unit according to claim 1;
   wherein the plurality of first light modulation areas are arranged with gaps provided therebetween along the first direction and a second direction which intersects with the first direction, respectively; and
   wherein the plurality of second light modulation areas are arranged with gaps provided therebetween along the first direction and the second direction, respectively.

4. The lamp unit according to claim 2,
   wherein the plurality of first light modulation areas are arranged with gaps provided therebetween along the first direction and a second direction which intersects with the first direction, respectively; and
   wherein the plurality of second light modulation areas are arranged with gaps provided therebetween along the first direction and the second direction, respectively.

5. The lamp unit according to claim 1;
wherein the first liquid crystal device and the second liquid crystal device are arranged such that, in a plan view, a portion of each of the first light modulation areas and a portion of each of the second light modulation areas adjacent to the first light modulation area overlap with each other.

6. The lamp unit according to claim 3;
wherein the first liquid crystal device and the second liquid crystal device are arranged such that, in a plan view, a portion of each of the first light modulation areas and a portion of each of the second light modulation areas adjacent to the first light modulation area overlap with each other.

7. The lamp unit according to claim 4;
wherein the first liquid crystal device and the second liquid crystal device are arranged such that, in a plan view, a portion of each of the first light modulation areas and a portion of each of the second light modulation areas adjacent to the first light modulation area overlap with each other.

8. A vehicular lamp system comprising:
the lamp unit according to claim 1, and a control unit that controls an operation of the light source and the optical shutter device of the lamp unit.

\* \* \* \* \*